July 10, 1928.

J. R. CHAMBERLIN 1,676,887

CORE DRILL BIT

Filed July 14, 1922

John R. Chamberlin
INVENTOR

BY
his ATTORNEYS

Patented July 10, 1928.

1,676,887

UNITED STATES PATENT OFFICE.

JOHN R. CHAMBERLIN, OF BRONXVILLE, NEW YORK.

CORE-DRILL BIT.

Application filed July 14, 1922. Serial No. 574,998.

The present invention relates to new and novel forms of rotary core drill bits.

The objects of the invention is to provide a drill bit of a suitable material, such as aluminum or an alloy thereof, and having a cutting member jointed thereto, said member consisting preferably of suitably sized carborundum crystals initially cemented together by a suitable vitreous binding material, although other metals and cutting crystals may be used, as more particularly set forth in my copending application filed June 19, 1922, Serial No. 569,356, issued February 9, 1926, as Patent No. 1,572,349.

By way of illustation I have shown one form of my invention in the accompanying drawings in which Fig. 1 is a vertical elevation of my new rotary core drill bit.

Figure 1:
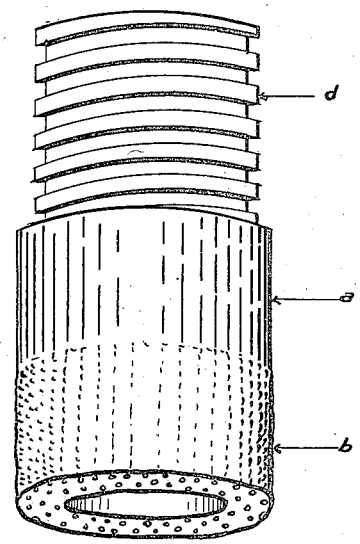
Figure 2:
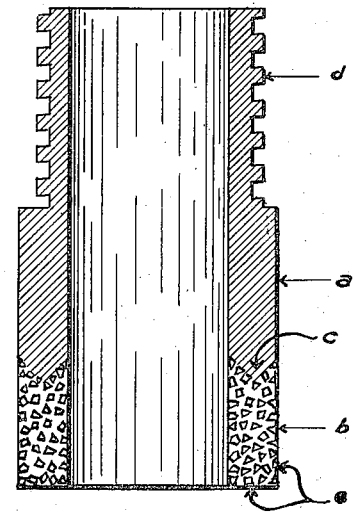
Fig. 2 is a vertical section of the bit shown in Fig. 1.
Figure 3:
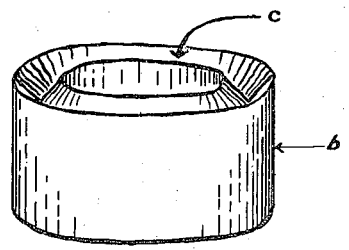
Fig. 3 is a perspective elevation of the cutting end of the bit before it is assembled and showing the top thereof hollowed out in V-shape preparatory to joining it to the upper part of the core drill bit.

Referring to the drawings, $a$ is the rotary core drill bit preferably of aliminum or an alloy thereof, although it may be made of iron, mild steel, copper, bronz, etc., and $b$ is the cutting end of said bit, in this instance comprising a ring composed of suitably sized carborundum crystals cemented together by a suitable vitreous binder, said binders being well known to manufactures of carborundum articles and needing no description here. The upper end of the ring of crystals $b$ is cut or ground or molded to present a V-shape, as shown at C and by virtue of this particular construction, the joining of the part $a$ to the part $b$ a greater surface of contact between the two parts is obtained than would be the case if they were joined on parallel horizontal surfaces and the molten metal of part $a$ in the mold forms a perfect union with rough surface of the part $b$ at the point of juncture $c$. The molten metal will penetrate in between the exposed crystals and the porous binder to a certain extent and aid in forming a firm union of the two parts. The completed core drill bit is provided with a screw thread connection $d$ permitting the joining thereof with a core barrel (not shown), which in turn is connected with suitable rotating drill rods (not shown), all in accordance with the usual drilling practice. In the manufacture of my new form of rotary core drill, as stated above, the crystal portion $b$ is hollowed out at its upper end to present a V-shape, although other suitable conformation may be utilized. This crystal member $b$ is placed in the bottom of a suitable mold and the molten metal, which may be aluminum or one of its alloys, or other suitable metal, and which is to constitute the part $a$ of the core drill bit is poured into the mold, the metal of the part $a$ filling the V-shape opening in the top of the part $b$ and being firmly united thereto, as shown at $c$, and seeping through between the contiguous crystals and the more or less porous binding material of the part $b$ for a short distance beyond the point of juncture as may be desired.

Before casting, I prefer to heat the mold and its contained ring of crystals $b$ to approximately the temperature of the molten metal, as I find that better juncture of the materials $a$ and $b$ at the point $c$ is obtained by so doing than is the case when the step of a preliminary heating of the mold and ring $b$ is omitted.

It will be understood that in the present form of core drill bit the metal does not extend between the crystals throughout the part $b$ but only a desired short portion in the neighborhood of the junction shown at $c$. This junction at $c$ is a good firm contact, by virtue of the loose texture of the ring $c$ whose coarse crystals and more or less porous binder presents a rough surface to the molten metal of $a$ and materially assists in forming a firm union with the metal when it is cast onto the said ring $b$.

As will be apparent from inspection, the lower side of the core drill bit $a$—$b$ presents an annular grinding surface which, having many crystal cutting points exposed wears away the rock by abrasion. The loose and porous texture of the carborundum ring $b$ causes the crystals, shown at $e$, to break away from the cutting face of the part $b$ during drilling operations, thus exposing successive cutting crystals at a rate determined by the speed of rotation and pressure of the core drill bit and the character of the material being operated on.

What I claim is:—

1. A rotary core drill bit comprising a metal tube and an end tube of cutting crystals bound together by a vitreous binder, said end tube being self-sustaining, and said metal tube having one end in contact with one end of said self-sustaining end tube of cutting crystals and binder with the metal thereof extending into interstices in said end tube whereby substantially all of said end tube is free of metal.

2. A rotary core drill bit comprising a metal tube and a cutting member composed solely of cutting crystals and non-metallic binding material, said cutting member being substantially co-axial with said metal tube, the contiguous end abutting connection of said metal tube with said member comprising metal of said metal tube within interstices of said cutting member.

In testimony whereof I hereto affix my signature.

JOHN R. CHAMBERLIN.